US008818448B2

(12) United States Patent
Kekki et al.

(10) Patent No.: US 8,818,448 B2
(45) Date of Patent: Aug. 26, 2014

(54) METHOD, APPARATUS AND COMPUTER PROGRAM PRODUCT FOR ENABLING USER CONTROL OF A FALLBACK CAPABILITY FOR CIRCUIT SWITCHED DOMAIN SUPPORT

(75) Inventors: Sami Johannes Kekki, Helsinki (FI); Hannu Ilmari Pirila, Turku (FI); Curt Wong, Sammamish, WA (US)

(73) Assignee: Nokia Corporation, Espoo (FI)

( * ) Notice: Subject to any disclaimer, the term of this patent is extended or adjusted under 35 U.S.C. 154(b) by 888 days.

(21) Appl. No.: 12/420,161

(22) Filed: Apr. 8, 2009

(65) Prior Publication Data
US 2009/0258671 A1 Oct. 15, 2009

Related U.S. Application Data

(60) Provisional application No. 61/043,329, filed on Apr. 8, 2008.

(51) Int. Cl.
*H04M 1/00* (2006.01)
*H04W 76/02* (2009.01)
*H04W 48/18* (2009.01)
*H04W 8/18* (2009.01)

(52) U.S. Cl.
CPC ............ *H04W 76/027* (2013.01); *H04W 48/18* (2013.01); *H04W 8/18* (2013.01)
USPC ...................... 455/552.1; 455/435.2; 455/439; 370/352; 370/356; 370/331

(58) Field of Classification Search
USPC ............ 455/552.1, 435.1–444; 370/331–338, 370/328, 352–356
See application file for complete search history.

(56) References Cited

U.S. PATENT DOCUMENTS

| 6,065,061 | A | 5/2000 | Blahut et al. |
| 8,243,725 | B2 * | 8/2012 | Aghili et al. .................. 370/354 |
| 8,279,834 | B2 * | 10/2012 | Mildh ............................. 370/331 |
| 8,306,537 | B2 * | 11/2012 | Burbidge et al. ............. 455/436 |
| 8,340,023 | B2 * | 12/2012 | Watfa et al. .................... 370/328 |
| 8,472,405 | B2 * | 6/2013 | Rune ............................... 370/331 |
| 8,504,043 | B2 * | 8/2013 | Wu et al. ........................ 455/436 |

(Continued)

FOREIGN PATENT DOCUMENTS

EP 1 081 971 A1 3/2001
WO WO 2007144029 A1 * 12/2007

OTHER PUBLICATIONS

International Search Report for PCT Application No. PCT/IB09/05211.

(Continued)

*Primary Examiner* — Sharad Rampuria
(74) *Attorney, Agent, or Firm* — Alston & Bird LLP

(57) ABSTRACT

An apparatus for enabling user control of a fallback capability for circuit switched domain support may include a processor and a memory. The memory may store executable instructions that in response to execution by the processor cause the apparatus to receive a service indication for a service related to a radio access technology not supported by a current serving domain, determine, based on previously stored user defined input, a response to the service indication with respect to conducting a fallback procedure to a radio access technology that supports the service, and execute the response based on a result of the determining.

14 Claims, 5 Drawing Sheets

(56) References Cited

U.S. PATENT DOCUMENTS

| | | | |
|---|---|---|---|
| 8,599,791 B2* | 12/2013 | Mukherjee et al. | 370/331 |
| 8,600,390 B2* | 12/2013 | Vikberg et al. | 455/439 |
| 2002/0080770 A1 | 6/2002 | Hall et al. | |
| 2003/0193910 A1* | 10/2003 | Shoaib et al. | 370/331 |
| 2004/0127158 A1 | 7/2004 | Dai et al. | |
| 2004/0162889 A1* | 8/2004 | Morris et al. | 709/217 |
| 2005/0111394 A1* | 5/2005 | Jung et al. | 370/312 |
| 2006/0230359 A1* | 10/2006 | Fischer | 715/781 |
| 2007/0249352 A1* | 10/2007 | Song et al. | 455/436 |
| 2009/0238194 A1* | 9/2009 | Basart et al. | 370/401 |
| 2009/0245496 A1* | 10/2009 | Maione et al. | 379/201.12 |
| 2010/0302937 A1* | 12/2010 | Hu et al. | 370/225 |

OTHER PUBLICATIONS

Office Action for Chinese Application No. 2009-80121337.5 dated Mar. 6, 2013.

"*3GPP TS 23.272 V8.12.0;*" 3rd Generation Partnership Project; Technical Specification Group Services and System Aspects; Circuit Switched (CS) fallback in Evolved Packet System (EPS); Stage 2 (Release 8); dated Jun. 2012; retrieved on Feb. 24, 2014 from <http://www.3gpp.org/DynaReport/23272.htm>.

Office Action for Chinese Application No. 200980121337.5; dated Nov. 21, 2013.

Supplemental European Search Report for Application No. EP 09 73 0531 dated Jun. 24, 2014.

CS Fallback Requirements, 3GPP TSG SA WG2 Meeting #62, TD S2-080121 (Jan. 2008) 1 page (XP050262651).

\* cited by examiner

METHOD, APPARATUS AND COMPUTER PROGRAM PRODUCT FOR ENABLING USER CONTROL OF A FALLBACK CAPABILITY FOR CIRCUIT SWITCHED DOMAIN SUPPORT

CROSS REFERENCE TO RELATED APPLICATIONS

This application claims the benefit of U.S. Provisional Application No. 61/043,329, filed Apr. 8, 2008, the contents of which are incorporated herein in their entirety.

TECHNOLOGICAL FIELD

Embodiments of the present invention relate generally to enabling user control of device features and, more particularly, relate to an apparatus, method and a computer program product for enabling user control of a fallback capability for circuit switched domain support.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. For example, the universal mobile telecommunications system (UMTS) terrestrial radio access networks (UTRAN) and the GERAN (GSM/EDGE radio access network) system are currently being developed. The E-UTRAN (evolved UTRAN), which is also known as Long Term Evolution (LTE) or 3.9G, is aimed at upgrading prior technologies by improving efficiency, lowering costs, improving services, making use of new spectrum opportunities, and providing better integration with other open standards.

An advantage of the communication systems currently under development, which continues to be shared with other preceding telecommunication standards, is the fact that users are enabled to access a network employing such standards while remaining mobile. Thus, for example, users having mobile terminals (or user equipment (UE)) equipped to communicate in accordance with such standards may travel vast distances while maintaining communication with the network. By providing access to users while enabling user mobility, services may be provided to users while the users remain mobile.

A basic architecture of a communication system may include a core (e.g., a third generation (3G) core, an evolved packet core (EPC) or the like) in communication with various nodes (e.g., base stations, access points, node Bs (NBs) or evolved node Bs (eNBs)). Each of the nodes may transmit over an air interface to a particular region or regions defined as cells. The nodes may define corresponding cells in which communication coverage is provided by a respective node. As such, a geographical area may be provided with coverage defined by a plurality of cells. Moreover, given that multiple radio access networks are currently in simultaneous use, it is possible that cells of different radio access technologies (RATs) may overlap.

System Architecture Evolution (SAE) of the third generation partnership project (3GPP) release 8 specifies a packet switched (PS) core network architecture for LTE. By definition, certain circuit switched (CS) services (e.g., voice, short message service (SMS), UDI, etc.) are not available in a PS only core network. Accordingly, CS services may only be available if a particular terminal (e.g., a UE) moves (or falls back) from the LTE/SAE domain to a CS domain of a legacy RAT (e.g., GERAN or UTRAN) whenever there is an incoming or outgoing CS service indication such as a page, CS service request or the like.

Currently, establishing a CS fallback capability has been defined as a simple procedure of triggering the terminal to move to the legacy RAT where there is CS domain support in response to a CS service indication. Accordingly, there may be scenarios in which the user may be engaged in an LTE/SAE service, but the service gets interrupted by an incoming CS service indication such as a page. Thus, the user may become frustrated by such interruptions since current fallback provisions merely by default make a CS service attach via LTE/SAE and thereafter cause any incoming CS page or other service indication to result in initiation of a fallback.

In light of the issues discussed above, it may be desirable to provide a mechanism for operation of user equipment in a manner that may overcome at least some of the disadvantages described above.

BRIEF SUMMARY OF EXEMPLARY EMBODIMENTS

Embodiments of the present invention are therefore provided that may enable management of fallback operations. In particular, embodiments of the present invention may enable the user of a mobile terminal (e.g., UE) to control the response of the node to situations that would otherwise cause a fallback by default. As such, for example, the user may choose to ignore a CS service indication or may pre-define rules or programs for the mobile terminal to enable the node to ignore a CS service indication under certain circumstances. In another alternative embodiment, the user may be enabled to provide device settings for the mobile terminal to enable the mobile terminal to disable CS fallback functionality in the network for the user's mobile terminal.

According to an exemplary embodiment, an apparatus for enabling user control of a fallback capability for circuit switched domain support is provided. The apparatus may include a processor and a memory. The memory may store executable instructions that in response to execution by the processor cause the apparatus to receive a service indication for a service related to a radio access technology not supported by a current serving domain, determine, based on previously stored user defined input, a response to the service indication with respect to conducting a fallback procedure to a radio access technology that supports the service, and execute the response based on a result of the determining.

According to another exemplary embodiment, a method for enabling user control of a fallback capability for circuit switched domain support is provided. The method may include receiving a service indication for a service related to a radio access technology not supported by a current serving domain, determining, based on previously stored user defined input, a response to the service indication with respect to conducting a fallback procedure to a radio access technology that supports the service, and executing the response based on a result of the determining.

According to an exemplary embodiment, a computer program product for enabling user control of a fallback capability for circuit switched domain support is provided. The computer program product includes at least one computer-readable storage medium having computer-executable program code instructions stored therein. The computer-executable program code instructions may include program code instructions for receiving a service indication for a service related to a radio access technology not supported by a current serving domain, determining, based on previously stored user defined input, a response to the service indication with respect to conducting a fallback procedure to a radio access technology that supports the service, and executing the response based on a result of the determining.

Accordingly, embodiments of the present invention may enable improved user experience with respect to reducing a likelihood of service interruption. Accordingly, embodiments of the present invention may provide for improved flexibility in dealing with configuration issues, while not creating a large burden with respect to altering existing techniques and standards.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
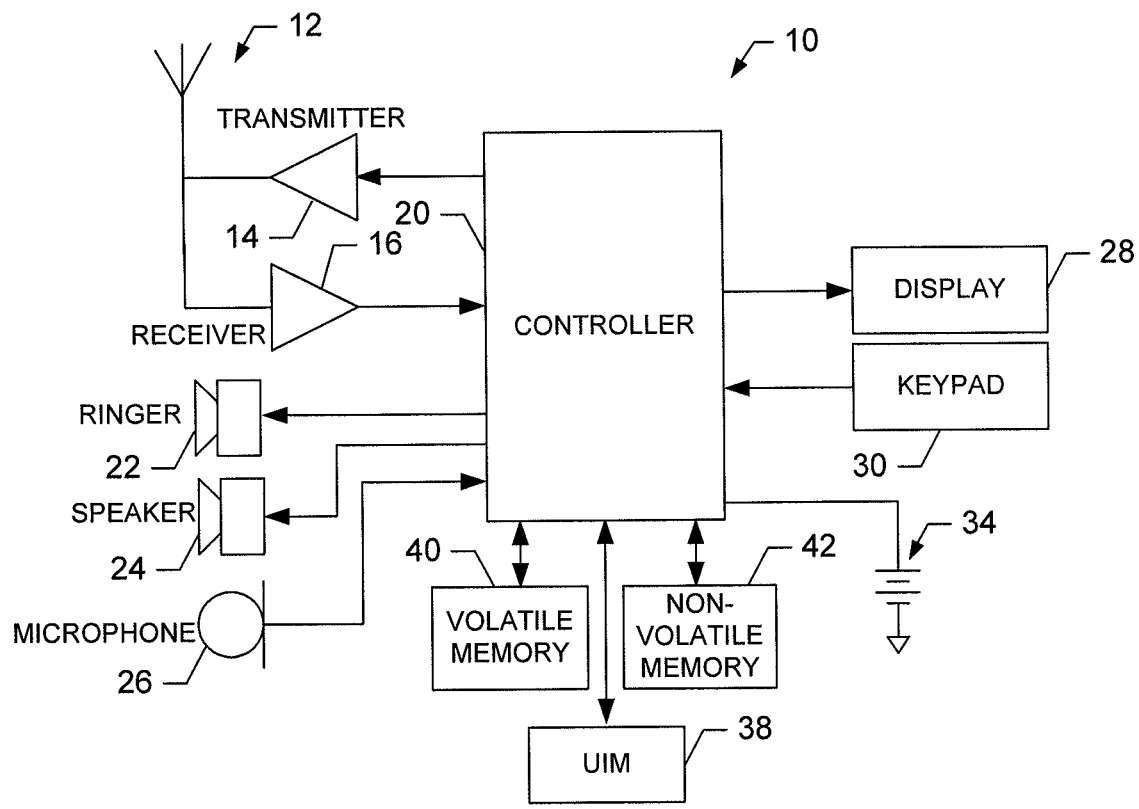
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1, one exemplary embodiment of the invention, illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 may be illustrated and hereinafter described for purposes of example, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, may readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention may be utilized in conjunction with a variety of other applications, both in the mobile communications industries and outside of the mobile communications industries.

The mobile terminal 10 may include an antenna 12 (or multiple antennas) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN, with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks described below in connection with FIG. 2.

It is understood that the apparatus, such as the controller 20, may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 may additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories may store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, e.g., cell id identity or cell id information, with which the mobile terminal 10 is in communication.

Figure 2:
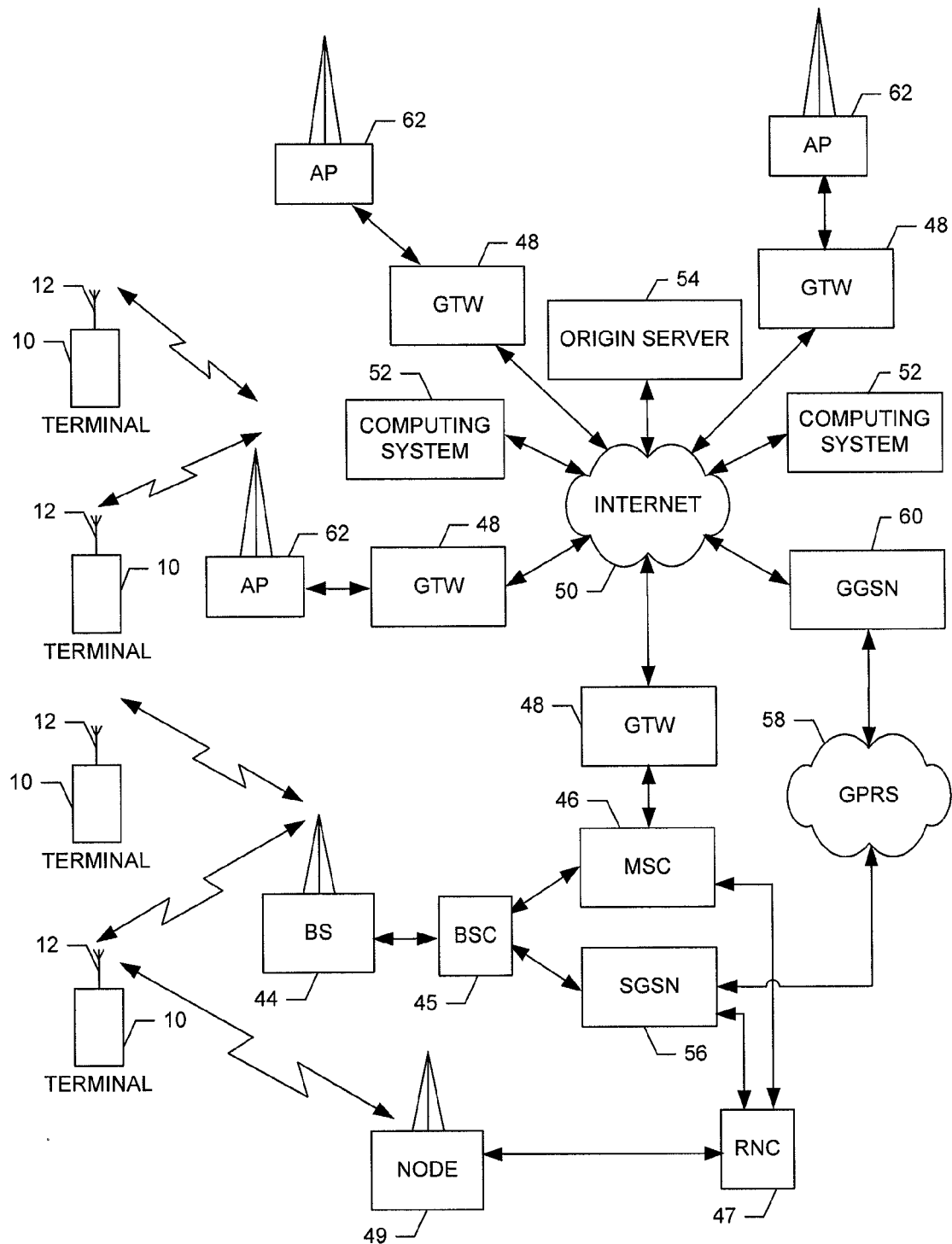
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 may also provide a connection to landline trunks when the mobile terminal 10 is involved in a call. In addition, the MSC 46 may be capable of controlling the forwarding of messages to and from the mobile terminal 10, and may also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 may be coupled to a data network, such as a local area network (LAN), a metropolitan area network (MAN), and/or a wide area network (WAN). The MSC 46 may be directly coupled to the data network. In one typical embodiment, however, the MSC 46 is coupled to a gateway device (GTW) 48 (which may include both user plane and control plane (MME) functions), and the GTW 48 is coupled to a WAN, such as the Internet 50. In turn, devices such as processing elements (e.g., personal computers, server computers or the like) may be coupled to the mobile terminal 10 via the Internet 50. For example, as explained below, the processing elements may include one or more processing elements associated with a computing system 52 (two shown in FIG. 2), origin server 54 (one shown in FIG. 2) or the like, as described below.

The BS 44 may also be coupled to a serving GPRS (General Packet Radio Service) support node (SGSN) 56. As known to those skilled in the art, the SGSN 56 is typically capable of performing functions similar to the MSC 46 for packet switched services. The SGSN 56, like the MSC 46, may be coupled to a data network, such as the Internet 50. The SGSN 56 may be directly coupled to the data network. In a more typical embodiment, however, the SGSN 56 is coupled to a packet-switched core network, such as a GPRS core network 58. The packet-switched core network is then coupled to another GTW 48, such as a gateway GPRS support node (GGSN) 60, and the GGSN 60 is coupled to the Internet 50. In addition to the GGSN 60, the packet-switched core network may also be coupled to a GTW 48. Also, the GGSN 60 may be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) may be capable of supporting communication in accordance with 2G wireless communication protocols IS-136 (TDMA), GSM, and IS-95 (CDMA). Also, for example, one or more of the network(s) may be capable of supporting communication in accordance with 2.5G wireless communication protocols GPRS, Enhanced Data GSM Environment (EDGE), or the like. Further, for example, one or more of the network(s) may be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 may further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 may be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 may communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 may additionally, or alternatively, include a removable memory capable of storing content, which may thereafter be transferred to the mobile terminal 10. Further, the mobile terminal 10 may be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

In some embodiments, the mobile terminal 10 may be capable of receiving communication from multiple cells (e.g., multiple BSs or APs) at any given time or at different times. Furthermore, in some embodiments, the system of FIG. 2 could represent a multiple radio access technology environment. In this regard, for example, the BS 44 may be coupled to the SGSN 56 and the MSC 46 via a base station controller (BSC) 45 that may control the BS 44. The BS 44 and the BSC 45 may be associated with a first radio access technology (RAT) (e.g., a 2G RAT). Meanwhile, the SGSN 56 and the MSC 46 may also be coupled to a radio network controller (RNC) 47 of a second RAT (e.g., a 3.9G RAT). The RNC 47 may in turn be in communication with one or more nodes (e.g., node-Bs) 49, one or more of which may be capable of communication with the mobile terminal 10 at any given time. As such, the mobile terminal 10 may be configured to be able to communicate with (e.g., select a cell associated with) either the first RAT or the second RAT. Furthermore, additional RATs may also be included in the system of FIG. 2 so that the mobile terminal 10 may be enabled to communicate with any of a plurality of different RATs.

In an exemplary embodiment, content or data may be communicated over the system of FIG. 2 between a mobile terminal, which may be similar to the mobile terminal 10 of FIG. 1, and a network device of the system of FIG. 2 in order to, for example, execute applications or establish communication (for example, for purposes of content or information sharing) between the mobile terminal 10 and other mobile terminals. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on a server, personal computer or other device, absent any communication with the system of FIG. 2.

Figure 3:
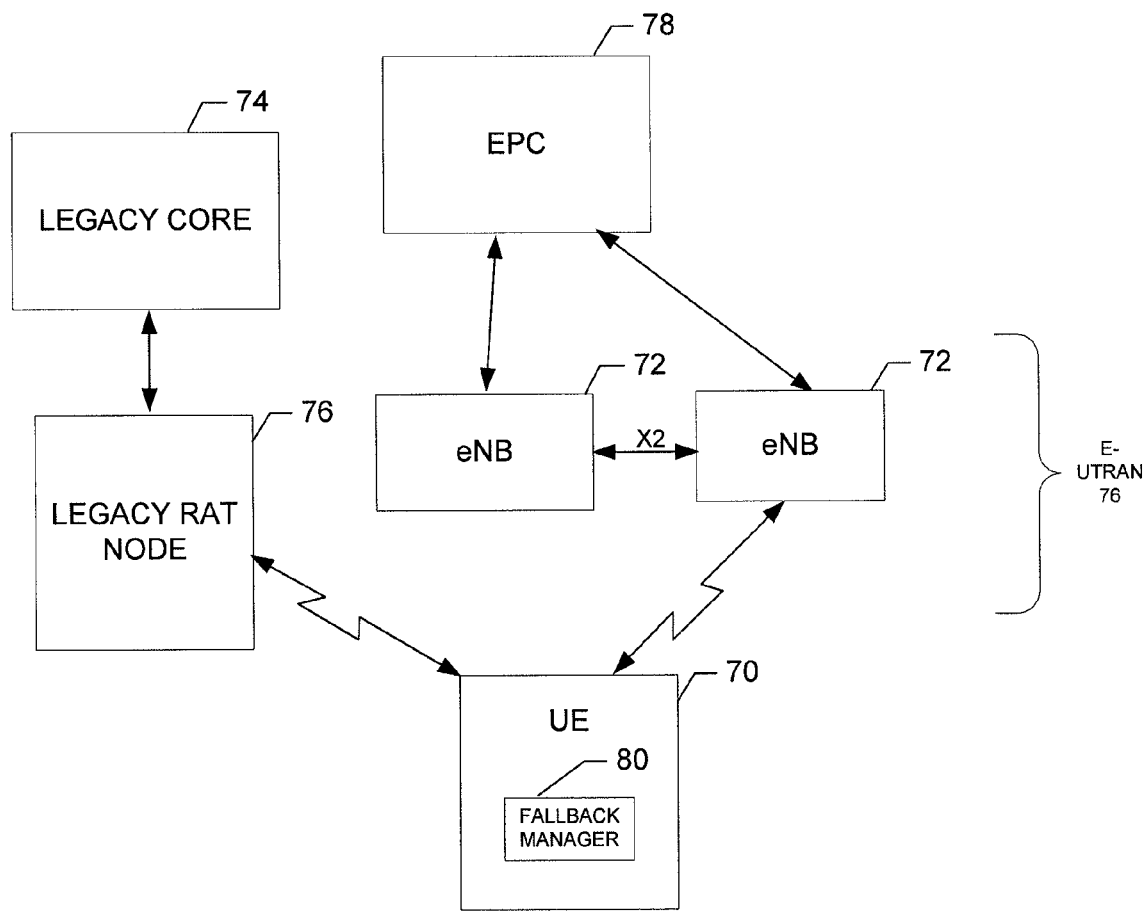
FIG. 3 illustrates a schematic block diagram of a system for enabling user control of a fallback capability for CS domain support according to an exemplary embodiment of the present invention.

An exemplary embodiment of the invention will now be described with reference to FIG. 3, in which certain elements of a system for providing a mechanism for enabling user control of a fallback capability for CS domain support are displayed. The system of FIG. 3 represents a specific embodiment of a network such as the general network displayed in FIG. 2, except that FIG. 3 represents a general block diagram including an E-UTRAN and a legacy RAT (e.g., GSM, UTRAN, GERAN, or the like). As such, in connection with FIG. 3, user equipment (UE) 70 may be exemplary of one embodiment of the mobile terminal 10 of FIG. 1 and eNBs (E-UTRAN node Bs) 72 may be similar in function to exemplary embodiments of either the BS 44 or AP 62 of FIG. 2. However, it should be noted that the system of FIG. 3, may also be employed in connection with a variety of other devices, both mobile and fixed, and therefore, embodiments of the present invention should not be limited to application on devices such as the mobile terminal 10 of FIG. 1 or the network devices of FIG. 2. Moreover FIG. 3, which illustrates E-UTRAN components should be understood to be, in some cases, used in connection with some legacy devices and components (e.g., such as UTRAN or other components of FIG. 2). As such, one or more of the APs of FIG. 2, could represent nodes such as NBs or eNBs if properly configured and equipped and placed in communication with a terminal such as the UE 70 of an embodiment of the present invention. Furthermore, the evolved packet core (EPC) of FIG. 3 could be replaced by a 3G or other core.

Referring now to FIG. 3, a schematic block diagram showing a system for providing a mechanism for enabling user control of a fallback capability for CS domain support according to an exemplary embodiment of the present invention is provided. The system includes an E-UTRAN 76 which may include, among other things, a plurality of node-Bs in communication with an EPC 78 which may include one or more mobility management entities (MMEs) and one or more system architecture evolution (SAE) gateways. The node-Bs may be E-UTRAN node-Bs (e.g., eNBs 72) and may also be in communication with the UE 70 and other UEs. Although FIG. 3 only shows two eNBs, there could be a plurality of nodes included in the system. The E-UTRAN 76 may be in communication with the EPC 78 as part of an EPS (Evolved Packet System).

The eNBs 72 may provide E-UTRA user plane and control plane (radio resource control (RRC)) protocol terminations for the UE 70. The eNBs 72 may provide functionality hosting for such functions as radio resource management, radio bearer control, radio admission control, connection mobility control, dynamic allocation of resources to UEs in both uplink and downlink, selection of an MME at UE attachment, IP header compression and encryption, scheduling of paging and broadcast information, routing of data, measurement and measurement reporting for configuration mobility, and the like.

The MME may host functions such as distribution of messages to respective node-Bs, security control, idle state mobility control, EPS bearer control, ciphering and integrity protection of NAS signaling, and the like. The SAE gateway may host functions such as termination and switching of certain packets for paging and support of UE mobility. In an exemplary embodiment, the EPC 78 may provide connection to a network such as the Internet.

As shown in FIG. 3, the UE 70 may also be capable of communication with a legacy core 74 via a legacy RAT node 76 (e.g., an AP, node or BS associated with a legacy RAT). In an exemplary embodiment, the legacy RAT may be assumed to be a CS domain RAT. As such, for example, if the UE 70 is in communication with one of the eNBs 72 of the EPS and a CS service indication is detected (e.g., an incoming or outgoing CS service indication such as a page, CS service request or the like), the UE 70 may be enabled to conduct a handover (e.g., a PS handover) to the CS domain by switching to communication with the legacy RAT node 76. Thus, the UE 70 may be enabled to utilize a CS fallback capability by switching to communication with the legacy RAT node 76 to respond to service indications that are not related to LTE services.

In an exemplary embodiment, the UE 70 may be further enabled to allow a user (e.g., an entity or individual associated with the UE 70) to control fallback functionality for the UE 70. As such, the UE 70 according to an exemplary embodiment, may further include a fallback manager 80. The fallback manager 80 may be any means such as circuitry or a device embodied in hardware, software (e.g., controller 20 operating under software control, the controller 20 embodied as an ASIC or FPGA specifically configured to perform the operations described herein, or a combination thereof) or a combination of hardware and software that is configured to perform the functions of the fallback manager 80 as described herein. In an exemplary embodiment, the fallback manager 80 of the UE 70 may operate under the control of, be included in or otherwise be embodied as a processor or processing element or the UE 70 (e.g., the controller 20). Furthermore, the fallback manager 80 may be configured to provide the user with an ability to define rules or scenarios under which CS fallback operations may be conducted and, if conducted, may further define characteristics related to the conduct of such operations.

Figure 4:
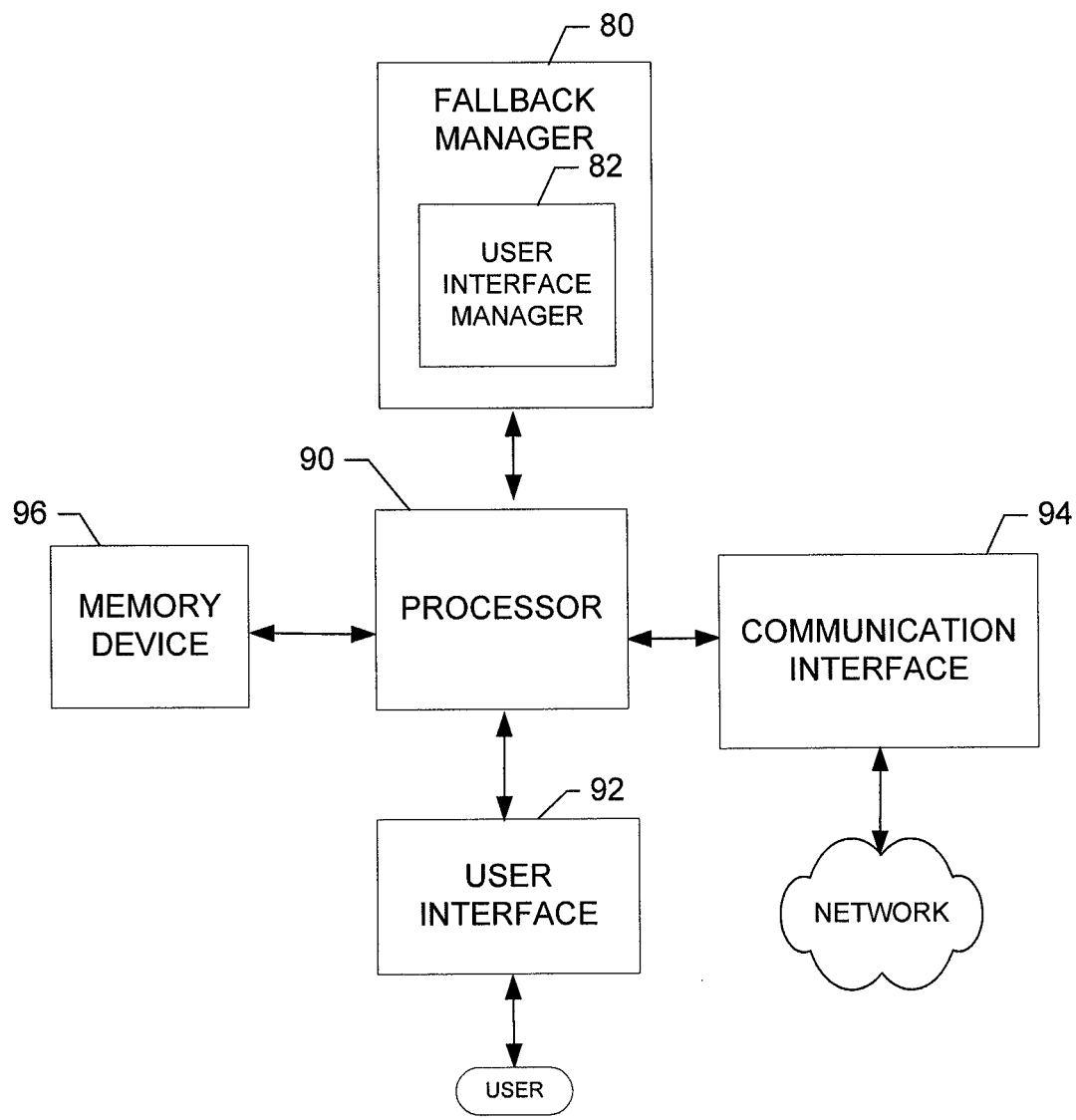
FIG. 4 illustrates a block diagram showing an apparatus for enabling user control of a fallback capability for CS domain support according to an exemplary embodiment of the present invention.

FIG. 4 shows a block diagram view of one example of an apparatus configured to perform exemplary embodiments of the present invention. In this regard, for example, an apparatus for enabling user control of a fallback capability for CS domain support according to an exemplary embodiment of the present invention may be embodied as or otherwise employed, for example, on the mobile terminal 10 (e.g., the UE 70). However, it should be noted that the apparatus of FIG. 4, may also be employed on a variety of other devices, both mobile and fixed, and therefore, embodiments of the present invention should not necessarily be limited to application on devices such as mobile terminals. It should also be noted that while FIG. 4 illustrates one example of a configuration of an apparatus for enabling user control of a fallback capability for CS domain support, numerous other configurations may also be used to implement embodiments of the present invention.

Referring now to FIG. 4, an apparatus for enabling user control of a fallback capability for CS domain support is provided. The apparatus may include or otherwise be in communication with a processor 90, a user interface 92, a communication interface 94 and a memory device 96. The memory device 96 may include, for example, volatile and/or non-volatile memory (e.g., volatile memory 40 and/or non-volatile memory 42). The memory device 96 may be configured to store information, data, applications, instructions or the like for enabling the apparatus to carry out various functions in accordance with exemplary embodiments of the present invention. For example, the memory device 96 could be configured to buffer input data for processing by the processor 90. Additionally or alternatively, the memory device 96 could be configured to store instructions corresponding to an application for execution by the processor 90. As yet another alternative, the memory device 96 may be one of a plurality of databases that store information in the form of static and/or dynamic information.

The processor 90 may be embodied in a number of different ways. For example, the processor 90 may be embodied as a processing element, a coprocessor, a controller or various other processing means or devices including integrated circuits such as, for example, an ASIC (application specific integrated circuit), FPGA (field programmable gate array), hardware accelerator or the like. In an exemplary embodiment, the processor 90 may be configured to execute instructions stored in the memory device 96 or otherwise accessible to the processor 90. As such, whether configured by hardware or software methods, or by a combination thereof, the processor 90 may represent an entity (e.g., physically embodied in circuitry) capable of performing operations according to embodiments of the present invention while configured accordingly. Thus, for example, when the processor 90 is embodied as an ASIC, FPGA or the like, the processor 90 may be specifically configured hardware for conducting the operations described herein. Alternatively, as another example, when the processor 90 is embodied as an executor of software instructions, the instructions may specifically configure the processor 90, which may in some cases otherwise be a general purpose processing element or other functionally configurable circuitry if not for the specific configuration provided by the instructions, to perform the algorithms and/or operations described herein. However, in some cases, the processor 90 may be a processor of a specific device (e.g., a mobile terminal or server) adapted for employing embodiments of the present invention by further configuration of the processor 90 by instructions for performing the algorithms and/or operations described herein. Meanwhile, the communication interface 94 may be embodied as any means such as a device or circuitry embodied in either hardware, software, or a combination of hardware and software that is configured to receive and/or transmit data from/to a network and/or any other device or module in communication with the apparatus. In this regard, the communication interface 94 may include, for example, an antenna (or antennas) and supporting hardware and/or software for enabling communications with a wireless communication network.

The user interface 92 may be in communication with the processor 90 to receive an indication of a user input at the user interface 92 and/or to provide an audible, visual, mechanical or other output to the user. As such, the user interface 92 may include, for example, a keyboard, a mouse, a joystick, a trackball, a touch screen display, a conventional display, a microphone, a speaker, or other input/output mechanisms.

In an exemplary embodiment, the apparatus may also include the fallback manager 80. The fallback manager 80 may be configured to communicate (e.g., via the processor 90) with the user interface 92 and the communication interface 94 in order to receive information related to making determinations with respect to fallback operations and providing mechanisms by which to inform the user and/or receive instructions from the user with respect to the fallback operations. In this regard, for example, the fallback manager 80 may be configured to receive indications (e.g., via the communication interface 94) regarding the receipt of a service indication from a legacy RAT (e.g., a CS service request or page) while the UE 70 is in communication with the EPS. The fallback manager 80 may also be configured to determine a current state or operating condition of the UE 70 (e.g., idle or active mode) with respect to the current serving domain of the UE 70 (e.g., LTE domain, PS domain, evolved PS domain (also known as the EPS) or CS domain). Based on the current serving domain of the UE 70 and the current operating condition or state of the UE 70, and based on rules that may be stored in the memory device 96, the fallback manager 80 may be configured to communicate internally to the UE 70 or externally to the network (e.g., the EPS) with regard to operations in relation to treatment of the received service indication.

In an exemplary embodiment, the rules upon which the fallback manager 80 operates may include rules defining fallback procedures and/or operations to be conducted in certain situations. In this regard, for example, the fallback manager 90 may provide instructions for the UE 70 to ignore or reject a service indication under certain circumstances. As an alternative, the fallback manager 90 may provide instructions or information to the EPS in relation to initiating handover procedures under certain circumstances. Some specific examples are described below for purposes of explanation and not of limitation.

As such, the fallback manager 80 according to an exemplary embodiment of the present invention may define a relatively simple mechanism to allow user control with regard to CS fallback operations. In an exemplary embodiment, the fallback manager 80 may include an interface manager 82, which may be any means such as a device or circuitry embodied in hardware, software or a combination of hardware and software that is configured to provide interface objects (e.g., icons, menu items, interface control consoles, or the like) to enable the user to provide configuration settings with respect to fallback operations. For example, the interface manager 82 may generate an interface control console indicating several selectable options from which the user may make specific selections to define rules for fallback operations. In this regard, for example, the user may provide instructions related to actions to take in certain scenarios such as determinations regarding the current mode of the UE 70. Thus, the user may define a response (e.g., ignore, block, reject, provide an indication to the UE 70 or the EPS, or the like) to be provided in response to receipt of a service indication (e.g., a service request or a page) for each mode of operation of the UE 70. The user defined response may then be stored (e.g., in the memory device 96) and, while operating in a first RAT (e.g., E-UTRAN) and in response to receipt of a service indication for a second RAT (e.g., a legacy RAT such as GSM), the fallback manager 80 may lookup the stored user defined response and operate in accordance with the instructions associated therewith.

Thus, the fallback manager 80 may be configured to operate in accordance with logic defined by user inserted rules that are received via the interface manager 82. In an exemplary scenario, the user may be allowed to configure the UE 70 (e.g., via the fallback manager 80 and rules defined via the interface manager 82) to decide whether to accept an incoming page received while the UE 70 is in an idle mode with respect to services provided by the EPS. If the user decides not to accept the page (e.g., by selecting a rule for not accepting pages in the idle mode), the UE 70 may reject or ignore the page message when such message is received in the idle mode. Meanwhile, for active mode handling, the user may define rules such that the UE 70 may include a flag during a service request procedure to indicate to the EPS that CS fallback for the current session is not to be disturbed. In other words, the fallback manager may provide an indication in the form of the flag to the EPS to indicate that no PS handover to the CS domain should be undertaken. Consequently, the UE 70 may stay in the current RAT and maintain its current state in the current RAT.

According to an exemplary embodiment, the same logic and interface management may be used for differentiating the treatment of different types of service indications. For example, different types of page (e.g., pages associated with different respective services), if such types are included or determinable from the page message, may each be assigned different responses based on user inputs to the interface manager 82. As such, different settings may be implemented for a page for an SMS than the settings implemented for a page for a conversational voice call or a video service, etc. In other words, the user may be enabled to provide guidance with regard to a response to be provided for service indications at least in part based on the service associated with the respective service indication. Thus, for example, embodiments of the present invention may configure the UE 70 to make decisions regarding fallback operations (e.g., ending one application associated with a first service in order to respond to a service indication from another application associated with a different service) based on user defined rules regarding responses in association with factors such as the applications involved.

In an exemplary embodiment, user settings may be provided to direct the UE 70 to conduct a CS detach operation with respect to the system to disable CS fallback functionality from the network side for the given UE 70. In order to enable the CS fallback capability later on, a CS re-attach operation may be employed. By conducting the CS detach operation, no messages from the CS domain may be sent to the UE 70 by the EPS.

Embodiments of the present invention may be provided by enabling service indications (e.g., page messages) to be ignored or rejected while still allowing the UE 70 to maintain its current state in its current system. As such, unlike conventional mechanisms which may automatically shift the UE 70 to a CS domain by performing a CS fallback if a CS service indication is received, embodiments of the present invention may enable the user to provide guidance via the user's own equipment (e.g., the UE 70) with regard to the circumstances under which the CS fallback is to be performed. Embodiments may also provide that the UE 70 may include a flag in the service request procedure to essentially indicate "do not disturb" to the EPS so that no PS handover to the CS domain is initiated by the EPS if the EPS is in receipt of a CS service indication intended for the UE 70. In order to enable such an embodiment, support for a CS detach operation as well as a CS re-attach operation may be provided. Thus, in some exemplary embodiments of the present invention, the UE 70 may enable the user to define conditions under which the UE 70 may ignore or reject service requests from one RAT while in communication with another RAT and/or may enable the user to define conditions under which the UE 70 may direct the system with which the UE 70 is in communication to block the provision of service indications from other RATs to the UE 70.

In some embodiments, the user may be engaged in a service or activity in relation to the EPS that may be active in nature, but may not be important enough to merit blocking service indications from other services. For example, the user may be browsing in LTE/SAE and, since the user may not be bothered by interruption of the browsing being conducted, the user may not object to receiving an incoming call or SMS. Thus, embodiments of the present invention do not necessarily limit the user to rigid pre-determinations with regard to blocking all service indications received while active in connection with another service or application. To the contrary, embodiments of the present invention may enable the user to define which services or applications are important enough to merit blocking of certain service indications (and if so, which ones), while defining other services or applications as lacking a level of importance sufficient to merit blocking of service indications.

Figure 5:
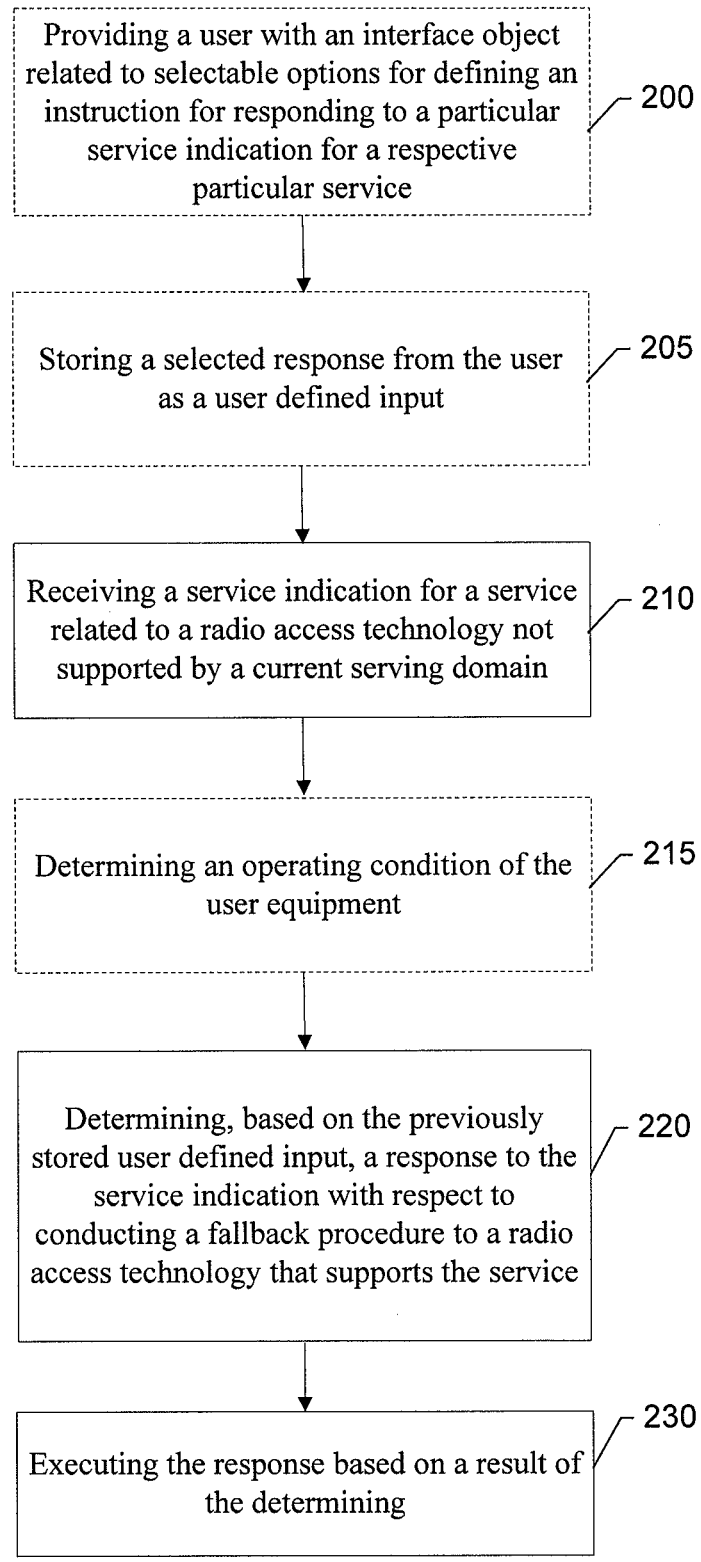
FIG. 5 is a flowchart according to an exemplary method of enabling user control of a fallback capability for CS domain support according to an exemplary embodiment of the present invention.

FIG. 5 is a flowchart of a system, method and program product according to exemplary embodiments of the invention. It will be understood that each block or step of the flowcharts, and combinations of blocks in the flowcharts, may be implemented by various means, such as hardware, firmware, processor, circuitry and/or other devices associated with execution of software including one or more computer program instructions. For example, one or more of the procedures described above may be embodied by computer program instructions. In this regard, the computer program instructions which embody the procedures described above may be stored by a memory device of the mobile terminal and executed by a processor in the mobile terminal. As will be appreciated, any such computer program instructions may be loaded onto a computer or other programmable apparatus (e.g., hardware) to produce a machine, such that the resulting computer or other programmable apparatus embodies means for implementing the functions specified in the flowchart's block(s) or step(s). These computer program instructions may also be stored in a computer-readable memory that may direct a computer or other programmable apparatus to function in a particular manner, such that the instructions stored in the computer-readable memory produce an article of manufacture including instructions the execution of which implement the functions specified in the flowchart's block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart's block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

In this regard, one embodiment of a method for enabling user control of a fallback capability for circuit switched domain support as provided in FIG. 5 may include receiving a service indication for a service related to a radio access technology not supported by a current serving domain at operation 210. The method may further include determining, based on previously stored user defined input, a response to the service indication with respect to conducting a fallback procedure to a radio access technology that supports the service at operation 220, and executing the response based on a result of the determining at operation 230.

In an alternative exemplary embodiment, further optional operations may be included which are shown in dashed lines in FIG. 5. In this regard, the method may further include providing the user with an interface object related to selectable options for defining an instruction for responding to a particular service indication for a respective particular service at operation 200, and storing a selected response from the user as the user defined input at operation 205. In an exemplary embodiment, the method may also include determining an operating condition of the UE at operation 215. In such an embodiment, executing the response may further include executing the response based on the previously stored user input defined for the determined operating condition (e.g., active or idle mode). Alternatively, determining the response may include determining a user defined response corresponding to one of a plurality of responses in which each of the plurality of responses corresponds to a respective different application currently operating.

In an alternative exemplary embodiment, determining the response may include determining a user defined response corresponding to one of a plurality of responses in which each of the plurality of responses corresponds to a respective different application associated with the service indication. In some embodiments, the method may be performed at a mobile terminal such that receiving the service indication comprises receiving the service indication at a mobile terminal, and executing the response comprises blocking or rejecting the service indication based on the user defined input. However, in certain alternative embodiments, the method may be performed at a network device (e.g., by a processor of a server) such that receiving the service indication comprises receiving the service indication at a network device, and executing the response comprises not providing the service indication to a device of the user based on the user defined input.

In an exemplary embodiment, an apparatus for performing the method above may include a processor (e.g., the processor 90) configured to perform each of the operations (200-230) described above. The processor may, for example, be configured to perform the operations by executing stored instructions for performing each of the operations. Alternatively, the apparatus may include means for performing each of the operations described above. In this regard, according to an exemplary embodiment, examples of means for performing operations 200 to 220 may include the fallback manager 80, the interface manager 82, or the processor 90.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a memory storing executable instructions that in response to execution by the processor cause the apparatus to at least:
   receive a service indication for a service related to a radio access technology not supported by a current serving domain;
   determine, based on previously stored user defined input, a response to the service indication with respect to conducting a fallback procedure to a radio access technology that supports the service, wherein the instructions configured to determine the response comprise instructions configured to determine a user defined response corresponding to one of a plurality of responses in which each of the plurality of responses corresponds to a respective different application that is currently operating or that is associated with the service indication; and
   execute the response based on a result of the determining, wherein executing the response comprises blocking or rejecting the service indication based on the user defined input.

2. The apparatus of claim 1, further comprising instructions that cause the apparatus to provide the user with an interface object related to selectable options for defining an instruction for responding to a particular service indication for a respective particular service.

3. The apparatus of claim 1, further comprising instructions that cause the apparatus to store a selected response from the user as the user defined input.

4. The apparatus of claim 1, further comprising instructions that cause the apparatus to determine an operating condition of a user device.

5. The apparatus of claim 4, wherein the instructions for executing the response comprise instructions for executing the response based on the previously stored user input defined for the determined operating condition.

6. The apparatus of claim 1, wherein the instructions for receiving the service indication comprise instructions for receiving the service indication at a network device, and instructions for executing the response comprise instructions for not providing the service indication to a device of the user based on the user defined input.

7. A method comprising:
   receiving a service indication for a service related to a radio access technology not supported by a current serving domain;
   determining, via a processor and based on previously stored user defined input, a response to the service indication with respect to conducting a fallback procedure to a radio access technology that supports the service, wherein determining the response comprises determining a user defined response corresponding to one of a plurality of responses in which each of the plurality of responses corresponds to a respective different application that is currently operating or that is associated with the service indication; and
   executing the response based on a result of the determining, wherein executing the response comprises blocking or rejecting the service indication based on the user defined input.

8. The method of claim 7, further comprising providing the user with an interface object related to selectable options for defining an instruction for responding to a particular service indication for a respective particular service.

9. The method of claim 7, wherein executing the response comprises executing the response based on the previously stored user input defined for a determined operating condition.

10. The method of claim 7, wherein receiving the service indication comprises receiving the service indication at a network device, and executing the response comprises not providing the service indication to a device of the user based on the user defined input.

11. A computer program product comprising at least one non-transitory computer-readable storage medium having computer-executable program code instructions stored therein, the computer-executable program code instruction comprising:
   program code instructions for receiving a service indication for a service related to a radio access technology not supported by a current serving domain;
   program code instructions for determining, based on previously stored user defined input, a response to the service indication with respect to conducting a fallback procedure to a radio access technology that supports the service, wherein the program code instructions for determining the response comprise program code instructions for determining a user defined response corresponding to one of a plurality of responses in which each of the plurality of responses corresponds to a respective different application that is currently operating or that is associated with the service indication; and
   program code instructions for executing the response based on a result of the determining, wherein executing the response comprises blocking or rejecting the service indication based on the user defined input.

12. The computer program product of claim 11, further comprising program code instructions for providing the user with an interface object related to selectable options for defining an instruction for responding to a particular service indication for a respective particular service.

13. The computer program product of claim 11, further comprising program code instructions for storing a selected response from the user as the user defined input.

14. The computer program product of claim 11, wherein program code instructions for executing the response include instructions for executing the response based on the previously stored user input defined for a determined operating condition.

* * * * *